US009921294B2

(12) United States Patent
Passler

(10) Patent No.: US 9,921,294 B2
(45) Date of Patent: Mar. 20, 2018

(54) GEO-LOCATION OF A WLAN DEVICE USING MOBILE MONITORING STATION

(71) Applicant: SR Technologies, Inc., Davie, FL (US)

(72) Inventor: Mark Passler, Boca Raton, FL (US)

(73) Assignee: SR Technologies, Inc., Davie, FL (US)

(*) Notice: Subject to any disclaimer, the term of this patent is extended or adjusted under 35 U.S.C. 154(b) by 83 days.

(21) Appl. No.: 15/220,059

(22) Filed: Jul. 26, 2016

(65) Prior Publication Data

US 2017/0030998 A1 Feb. 2, 2017

Related U.S. Application Data

(60) Provisional application No. 62/197,878, filed on Jul. 28, 2015.

(51) Int. Cl.
*G01S 5/10* (2006.01)
*G01S 5/14* (2006.01)
*G01S 5/06* (2006.01)

(52) U.S. Cl.
CPC . *G01S 5/14* (2013.01); *G01S 5/06* (2013.01)

(58) Field of Classification Search
CPC ....... H04W 4/02; H04W 64/00; H04W 84/12; G01S 5/00; G01S 5/06; G01S 5/14
See application file for complete search history.

(56) References Cited

U.S. PATENT DOCUMENTS

| 6,266,014 | B1* | 7/2001 | Fattouche | G01S 5/0009 |
| | | | | 342/450 |
| 8,233,457 | B1* | 7/2012 | Chen | G01S 13/878 |
| | | | | 370/332 |
| 8,842,571 | B1* | 9/2014 | Yu | H04L 25/26 |
| | | | | 370/252 |
| 9,618,603 | B2* | 4/2017 | Ben-Haim | G01S 5/10 |
| 9,801,019 | B2* | 10/2017 | Nallampatti Ekambaram | H04W 4/023 |
| 2007/0226530 | A1* | 9/2007 | Celinski | G06F 1/12 |
| | | | | 713/500 |
| 2009/0257426 | A1* | 10/2009 | Hart | G01S 5/0226 |
| | | | | 370/350 |
| 2010/0069035 | A1* | 3/2010 | Johnson | H04W 4/02 |
| | | | | 455/404.1 |
| 2011/0216660 | A1* | 9/2011 | Lee | H04J 3/06 |
| | | | | 370/252 |

(Continued)

*Primary Examiner* — Lester G Kincaid
*Assistant Examiner* — William Y Wang
(74) *Attorney, Agent, or Firm* — Christopher & Weisberg, PA

(57) ABSTRACT

A passive geo-location scheme of Wi-Fi access points is described using one or more mobile measuring stations. The methods and arrangements herein relate to, in one embodiment, using the TSF timer in beacons received by the measuring station, the reported TODs, the TOAs measured by the measuring station and synchronization between the timers of the wireless device and the measuring station. The synchronization includes applying a factor α for correcting the timer associated with the measuring station when the measuring station receives the beacons, applying a factor β for correcting a ratio of timer rates between the timer associated with the wireless device and the timer associated with the measuring station, and applying a factor γ for correcting changes in a timer rate ratio between the first timer associated with the wireless device and the timer associated with the measuring station.

17 Claims, 11 Drawing Sheets

(56) References Cited

U.S. PATENT DOCUMENTS

| | | | | |
|---|---|---|---|---|
| 2011/0268097 A1* | 11/2011 | Agrawala | ............... | G01S 5/021 |
| | | | | 370/338 |
| 2013/0148639 A1* | 6/2013 | Gao | ..................... | H04J 3/0641 |
| | | | | 370/336 |
| 2014/0045522 A1* | 2/2014 | Sugar | .................... | H04W 4/023 |
| | | | | 455/456.1 |
| 2014/0357292 A1* | 12/2014 | Walma | .................. | H04W 64/00 |
| | | | | 455/456.1 |
| 2016/0110591 A1* | 4/2016 | Smith | ................ | G06K 9/00302 |
| | | | | 382/103 |
| 2016/0237923 A1* | 8/2016 | Kitagawa | ............. | F02D 35/023 |

\* cited by examiner

GEO-LOCATION OF A WLAN DEVICE USING MOBILE MONITORING STATION

CROSS-REFERENCE TO RELATED APPLICATION

This application claims priority to U.S. Provisional Application Ser. No. 62/197,878, filed Jul. 28, 2015, entitled GEO-LOCATION OF A WLAN DEVICE USING MOBILE MONITORING RECEIVER, the entirety of which is incorporated herein by reference.

STATEMENT REGARDING FEDERALLY SPONSORED RESEARCH OR DEVELOPMENT n/a

FIELD

The present disclosure relates to a method and measuring station for geo-location of wireless devices and in particular to the geo-location and wireless local area network (WLAN) devices.

BACKGROUND

The location of WLAN devices can be performed by various means. Of particular interest for this disclosure is the location of devices that are based upon the IEEE 802.11 technology, commonly known as Wi-Fi. Various methods can be used to locate an access point (AP) or a station (STA). These methods may be classified as active, passive and combined active and passive. In an active location scheme, a device that is determining the location or range, the measuring device (also referred to as "measuring station") transmits certain packets to the device being located, the target device, and the common method is to measure the time of arrival (TOA) of the response from the target device and compare that to the time of departure (TOD) that the packet was transmitted by the measuring device. In a passive location scheme, a measuring device simply monitors the TOAs of non-stimulated transmissions from the target device.

In such location systems, it is common to use multiple measuring devices to determine the location. In such a scheme, simultaneous TOA and/or TOD measurements are taken by different measuring devices situated at different points, and from these measurements the location of the target device is calculated. For example, in a passive location scheme, the TOA of a transmission from the target may be simultaneously received at several sites. The difference in the TOAs between two sites is known as the time difference of arrival (TDOA). The TDOA is related to the difference in path lengths between the target and each receiving site, and for each pair of receivers the TDOA results in a hyperbola along which the location of the target lies. The addition of a third site will provide a second hyperbola and the location of the target will be indicated by the interception of the two hyperbolas.

First consider the following review of the TDOA method so that differences with the proposed method and arrangements of the present disclosure can be readily understood. FIG. 1 is a diagram of a typical passive location system 100 which includes three measuring stations 110a, 110b and 110c (referred to collectively herein as "measuring stations" or "measuring receivers"). The target 120 is a wireless device (also referred to as "WD"), such as, for example, an Access Point (AP) that is to be located by the three measuring stations. The distance of the wireless device 120 from receiving station 110a is D1, 130. The distance of the wireless device 120 from receiving station 110b is D2, 140. The distance of the wireless device 120 from receiving station 110c is D3, 150. A transmission from the wireless device 120 is received at each of the three measuring stations 11, 12, and 13, at times t1, t2, and t3 which are directly related to the distances D1, 21, D2, 22 and D3, 23. If the transmission from the wireless device 120 is at time T1, then it will be received at a measuring station at time (T1+Dx/c) where D is the distance of the measuring station from the wireless device 120, and c is the speed of light. Hence, t1=T1+D1/c, t2=T1+D2/c and t3=T1+D3/c. The TDOA for the measuring stations 110a and 110b is therefore TDOA12=t1−t2=(D1−D2)/c, and the TDOA for the measuring stations 110b and 110c is TDOA23=t2−t3=(D2−D3)/c. The methods for calculating the intersections of the two resulting hyperbolas are well known in the art.

FIG. 2 is a block schematic diagram of an exemplary IEEE 802.11 infrastructure network 200. A number of stations, 220a, 220b, 220c, 220d, 220e, and 220f are associated to a wireless device 120 such as an access point ("AP"), which, in turn, is connected to a hard wired distribution system, DS, 210. Thus, "wireless device" as used throughout this disclosure need not be a totally wireless device and may be connected to a wired network. In such a network, wireless device 120 will transmit beacons periodically in order to allow mobile stations to locate and identify the network and to convey information to stations, in particular the timestamp, beacon interval and capability information.

FIG. 3 is a diagram that depicts the transmissions of the beacons with respect to the time axis 300. The wireless device 120 in FIG. 2, will attempt to transmit beacons 330, 340, 350, 360 and 370 at a regular time interval, tb, 310, known as Target Beacon Transmission time, TBTT. In practice, the time tb' 320 between the two beacons may be greater or less than TBTT. The wireless device 120 advertises this ideal interval, TBTT, in the beacon frame. The beacon transmission may be delayed beyond TBTT because of other traffic. In addition, because a beacon is never retransmitted, if the reception of the beacon at a station is corrupted for any reason, it is possible that that station may not receive every beacon. A field that is included in the beacon packet and is transmitted within every beacon is the Timestamp which is 64 bits long and contains the value of the wireless device's synchronization timer at the time that the frame was transmitted. This is known as the timer synchronization function, or TSF. In an infrastructure network, associated stations will update their own TSF timer with the value of the timer it receives from the wireless device 120 in the beacon frame, modified by any processing time required to perform the update operation. This way associated stations maintain synchronous timing with the wireless device 120. In the case that the beacon TOA is being measured by an un-associated measuring station, then the measuring station will not update its timer to synchronize with the wireless device TSF. A common tolerance for the timer within wireless device 120 is about 3 ppm and it is desirable that the timers of wireless device 120 and of the measuring station maintain a constant drift with respect to absolute time, and that the relative drift between the timers needs to be assessed.

The TDOA approach as described above requires multiple receivers with disparate measurement of the same signal whose timing needs to be processed at a central analysis point. In this approach, it is required that the exact position of each of the receivers is known. An alternative approach is to use mobile receiving stations and the locations of the receivers for each measurement is then transmitted together with the time of arrival measurements. In either case, however, multiple receiving stations are used.

SUMMARY

The present disclosure advantageously provides a method and measuring station for determining a location of a wireless device. In one aspect of the disclosure, the method includes identifying a plurality of Time of Departures (TODs) of a corresponding plurality of beacons received at a measuring station, each of the plurality of TODs indicating when the wireless device transmitted a beacon to the measuring station according to a timer associated with the wireless device, identifying a plurality of Time of Arrivals (TOAs) corresponding to the plurality of beacons at the measuring station according to a timer associated with the measuring station, and synchronizing the timer associated with the wireless device with the timer associated with the measuring station. The synchronizing includes applying a factor $\alpha$ for correcting the timer associated with the measuring station when the measuring station receives the plurality of beacons, applying a factor $\beta$ for correcting a ratio of timer rates between the timer associated with the wireless device and the timer associated with the measuring station, and applying a factor $\gamma$ for correcting changes in a timer rate ratio between the timer associated with the wireless device and the timer associated with the measuring station. The method further includes determining a plurality of travel times (TTs) corresponding to the plurality of beacons, the plurality of TTs based at least in part upon the plurality of TODs, the plurality of TOAs, and the synchronization of the timer associated with the wireless device and the timer associated with the measuring station, and determining a location of the wireless device based at least in part on the determined plurality of TTs, and the synchronization of the timer associated with the wireless device and the timer associated with the measuring station.

In one embodiment of this aspect, determining the plurality of TTs is determined according to: $TT=[TSFn^{MS}-(TSFo^{MS}+\alpha)]-\beta*(TSFn^{WD}-TSFo^{WD})-\gamma*(TSFn^{WD}-TSFo^{WD})^2$, where, $TSFn^{MS}$ is a value of the timer associated with the measuring station when an nth beacon arrives at the measuring station, $TSFo^{MS}$ is a value of the timer associated with the measuring station when a first beacon arrives at the measuring station, $TSFn^{WD}$ is a value of a timer synchronization function (TS) field in the nth beacon sent by the wireless device, and $TSFo^{WD}$ is a value of the TSF field in the first beacon sent by the wireless device.

In another embodiment of this aspect, the method further includes determining an alternate plurality of travel times $(TT_2)$ as determined according to: $TT_2=[TSFn^{MS}-(TSFo^{MS}+\alpha)]-\beta*(TSFn^{WD}-TSFo^{WD})$, comparing $TT_2$ with TT, and determining the location of the wireless device using at least in part a selected one of $TT_2$ and TT. In another embodiment of this aspect, determining the location of the wireless device includes obtaining a plurality of estimated distances Di between the wireless device and the measuring station for a plurality of geographic locations i by varying at least one of an estimated longitude of the wireless device, an estimated latitude of the wireless device and an estimated altitude of the wireless device, calculating a lowest sum of square residuals (SSR) value according to $SSR=\Sigma i[Di-c*TTi]^2$, where c is a speed of light and TTi is a travel time of a beacon sent by the wireless device for geographic location i, selecting a distance D of the plurality of estimated distances Di between the wireless device and the measuring station corresponding to the calculated lowest SSR value, and determining the location of the wireless device based at least in part on the selected distance D between the wireless device and the measuring station.

In another embodiment of this aspect, at least one of the plurality of beacons includes a timer synchronization function (TSF) field containing a corresponding TOD of the plurality of TODs. In another embodiment of this aspect, the measuring station is located in one of a ground vehicle, a vessel in a body of water and an airborne vehicle. In another embodiment of this aspect, at least one of the plurality of TOAs is identified as a time when a frame check of a corresponding received beacon is completed.

In another embodiment of this aspect, the plurality of beacons are received by the measuring station as the measuring station travels in an orbit around the wireless device. According to another embodiment of this aspect, beacons of the plurality of beacons are received at the measuring station at opposite sides of the orbit.

According to another aspect of the disclosure, a measuring station for determining a location of a wireless device is provided. The measuring station includes an interface configured to receive a plurality of beacons from the wireless device, and processing circuitry including a memory and a processor, the memory in communication with the processor, the memory having instructions that, when executed by the processor, configure the processor to perform a variety of tasks. These tasks include identifying a plurality of Time of Departures (TODs) of a corresponding plurality of beacons received at the measuring station, each of the plurality of TODs indicating when the wireless device transmitted a beacon to the measuring station according to a timer associated with the wireless device, identifying a plurality of Time of Arrivals (TOAs) corresponding to the plurality of beacons at the measuring station according to a timer associated with the measuring stations, and synchronizing the timer associated with the wireless device with the timer associated with the measuring station. The synchronizing includes applying a factor $\alpha$ for correcting the timer associated with the measuring station when the measuring station receives the plurality of beacons, applying a factor $\beta$ for correcting a ratio of timer rates between the timer associated with the wireless device and the timer associated with the measuring station, and applying a factor $\gamma$ for correcting changes in a timer rate ratio between the timer associated with the wireless device and the timer associated with the measuring station.

In this embodiment, the processor is further configured to determine a plurality of travel times (TTs) corresponding to the plurality of beacons, the plurality of TTs based at least in part upon the plurality of TODs, the plurality of TOAs, and the synchronization of the timer associated with the wireless device and the timer associated with the measuring station, and determine a location of the wireless device based at least in part on the determined plurality of TTs, and the synchronization of the timer associated with the wireless device and the timer associated with the measuring station.

According to one embodiment of this aspect, determining the plurality of TTs is determined according to $TT=[TSFn^{MS}-(TSFo^{MS}+\alpha)]-\beta*(TSFn^{WD}-TSFo^{WD})-\gamma*(TSFn^{WD}-TSFo^{WD})^2$, where, $TSFn^{MS}$ is a value of the timer associated with the measuring station when an nth beacon arrives at the measuring station, $TSFo^{MS}$ is a value of the timer associated with the measuring station when the first beacon arrives at the measuring station, $TSFn^{WD}$ is a value of the TSF in the nth beacon sent by the wireless device, and $TSFo^{WD}$ is a value of the TSF in the first beacon sent by the wireless device.

In another embodiment of this aspect, the memory further stores instructions that, when executed by the processor further configure the processor to determine an alternate plurality of travel times ($TT_2$) of as determined according to: $TT_2=[TSFn^{MS}-(TSFo^{MS}+\alpha)]-\beta*(TSFn^{WD}-TSFo^{WD})$, compare $TT_2$ with TT, and determine the location of the wireless device using at least in part one of $TT_2$ and TT.

In another embodiment of this aspect, determining the location of the wireless device includes obtaining a plurality of estimated distances Di between the wireless device and the measuring station for a plurality of geographic locations i by varying at least one of an estimated longitude of the wireless device, an estimated latitude of the wireless device and an estimated altitude of the wireless device, calculating a lowest sum of square residuals (SSR) value according to $SSR=\Sigma i[Di-c*TTi]^2$, where c is a speed of light and TTi is a travel time of a beacon sent by the wireless device at geographic location i, selecting a distance D of the plurality of estimated distances Di between the wireless device and the measuring station corresponding to the lowest SSR value, and determining the location of the wireless device based at least in part on the selected distance D between the wireless device and the measuring station.

In another embodiment of this aspect, at least one of the plurality of beacons includes a timer synchronization function (TSF) field containing a corresponding TOD of the plurality of TODs. In another embodiment of this aspect, the measuring station is located in one of a ground vehicle, a vessel in a body of water, and an airborne vehicle. In another embodiment of this aspect, at least one of the plurality of TOAs is identified as a time when a frame check of a corresponding received beacon is completed.

In another embodiment of this aspect, the interface is configured to receive the plurality of beacons as the measuring station travels in an orbit around the wireless device. In another embodiment of this aspect, the interface is configured to receive beacons of the plurality of beacons at opposite sides of the orbit.

According to another aspect of this disclosure, a measuring station for determining a location of a wireless access point is provided. The measuring station includes an interface configured to receive a plurality of beacons from the wireless access point, and processing circuitry including a memory and a processor, the memory in communication with the processor, the memory having instructions that, when executed by the processor, configure the processor to perform a variety of tasks. These tasks include identifying a plurality of Time of Departures (TODs) of a corresponding plurality of beacons received at the measuring station, each of the plurality of TODs indicating when the wireless access point transmitted a beacon to the measuring station according to a timer associated with the wireless access point, identifying a plurality of Time of Arrivals (TOAs) corresponding to the plurality of beacons at the measuring station according to a timer associated with the measuring station and synchronizing the timer associated with the wireless access point with the timer associated with the measuring station. The synchronizing includes applying a factor $\alpha$ for correcting the timer associated with the measuring station when the measuring station receives the plurality of beacons, applying a factor $\beta$ for correcting a ratio of timer rates between the timer associated with the wireless access point and the timer associated with the measuring station, and applying a factor $\gamma$ for correcting changes in a timer rate ratio between the timer associated with the wireless access point and the timer associated with the measuring station. The processor is further configured to determine a plurality of travel times (TTs) corresponding to the plurality of beacons, the plurality of TTs based at least in part upon the plurality of TODs, the plurality of TOAs, and the synchronization of the timer associated with the wireless access point and the timer associated with the measuring station, and determine a location of the wireless access point based at least in part on the determined plurality of TTs, the synchronization of the timer associated with the wireless access point and the timer associated with the measuring station.

In one embodiment of this aspect, the determining of the location of the wireless access point includes obtaining a plurality of estimated distances Di between the wireless access point and the measuring station for a plurality of geographic locations i by varying at least one of an estimated longitude of the wireless access point, an estimated latitude of the wireless access point and an estimated altitude of the wireless access point, calculating a lowest sum of square residuals (SSR) value according to $SSR=\Sigma i[Di-c*TTi]^2$, where c is a speed of light and TTi is a travel time of a beacon sent by the wireless access point at geographic location i, selecting a distance D of the plurality of estimated distances Di between the wireless access point and the measuring station corresponding to the lowest SSR value, and determining the location of the wireless access point based at least in part on the selected distance D between the wireless access point and the measuring station.

According to one embodiment of this aspect, determining the plurality of TTs is determined according to: $TT=[TSFn^{MS}-(TSFo^{MS}+\alpha)]-\beta*(TSFn^{WD}-TSFo^{WD})-\gamma*(TSFn^{WD}-TSFo^{WD})^2$, where, $TSFn^{MS}$ is a value of the timer associated with the measuring station when an nth beacon arrives at the measuring station, $TSFo^{MS}$ is a value of the timer associated with the measuring station when a first beacon arrives at the measuring station, $TSFn^{WD}$ is a value of a timer synchronization function (TSF) field in the nth beacon sent by the wireless access point, and $TSFo^{WD}$ is a value of the TSF in the first beacon sent by the wireless access point.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

In order to use a single measuring station that takes passive measurements of multiple signals an embodiment evaluates the timing of a series of measurements in order to determine a synchronization function for the target timer and the receiver timer and hence determine the target location. One embodiment of this disclosure is for the case when a single measuring device is used in the passive mode and when the target is a device that is based upon the IEEE 802.11 technology, commonly known as Wi-Fi.

Figure 1:
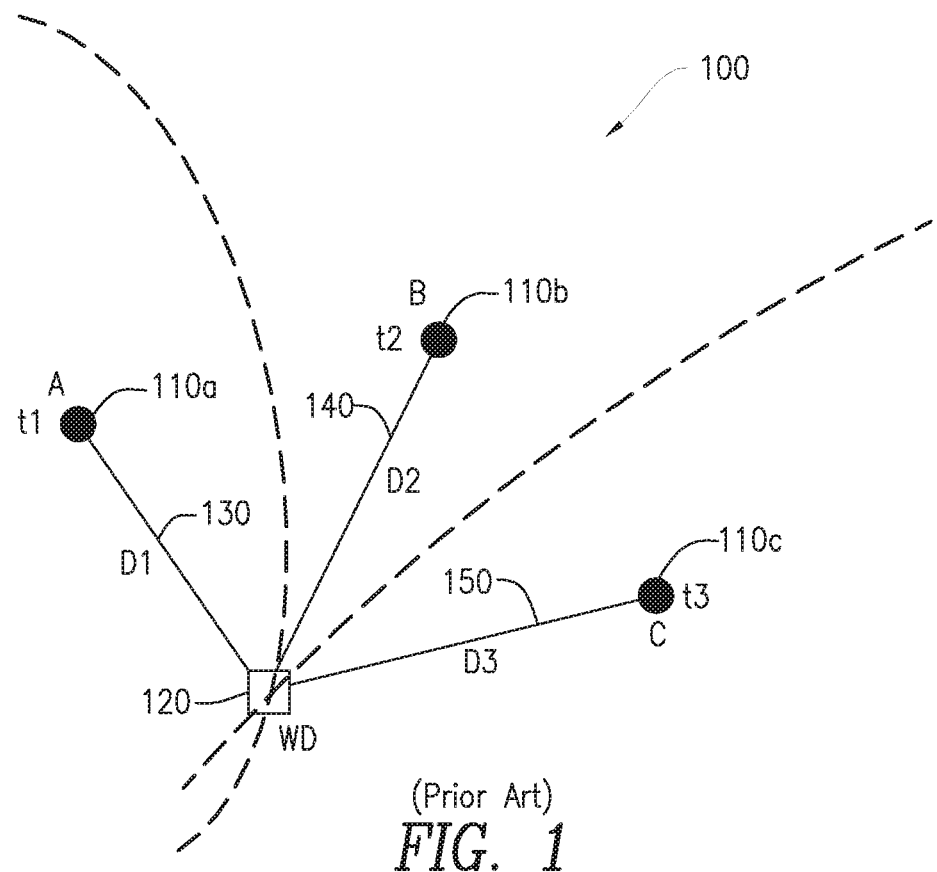
FIG. 1 is a diagram of a passive location system which consists of multiple measuring stations.
Figure 2:
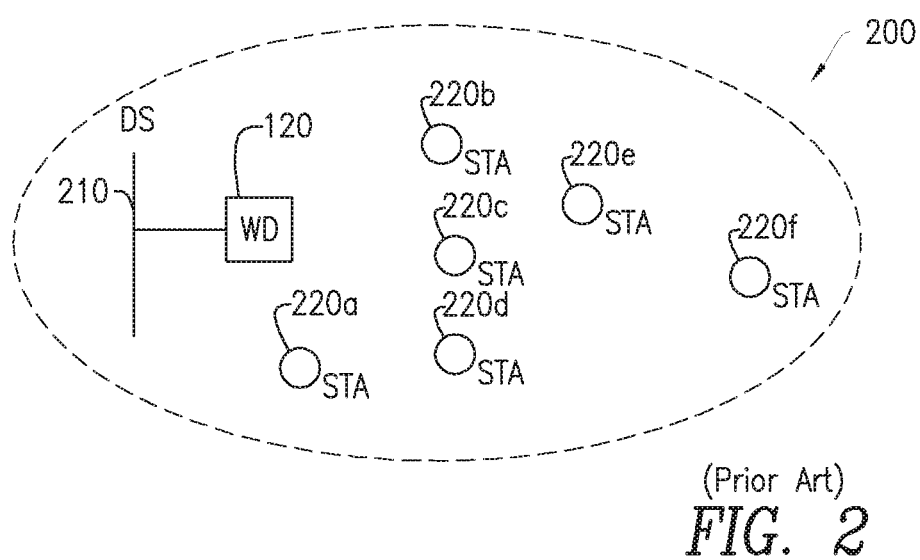
FIG. 2 is a block schematic diagram of an exemplary IEEE 802.11 infrastructure network.
Figure 3:
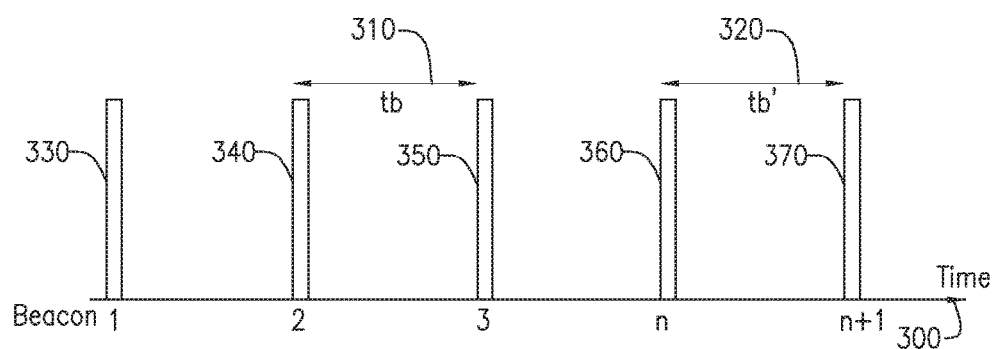
FIG. 3 is a diagram depicting the transmissions of the beacons over time by a wireless device.
Figure 4A:
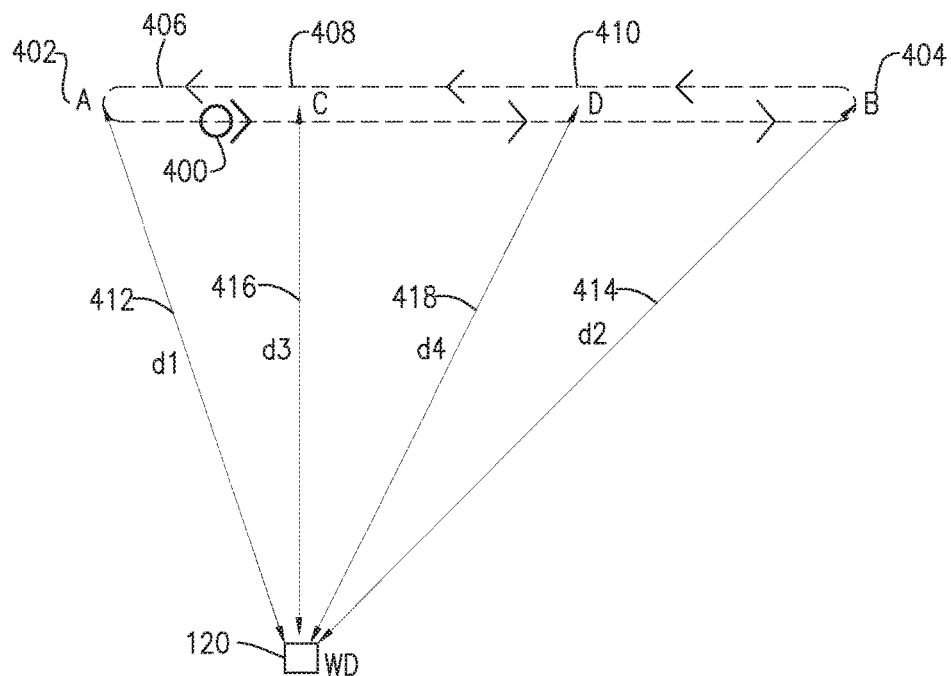
FIG. 4a is a diagram depicting a measuring station moving in a pattern between two points utilizing the principles of the present disclosure.
Figure 4B:
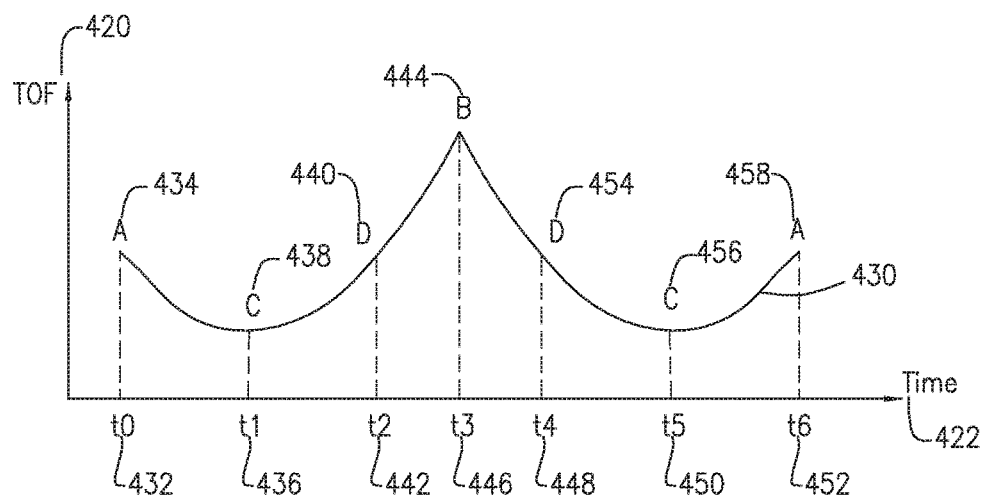
FIG. 4b is a graph depicting the Time of Flight (TOF) of beacons transmitted by a wireless device utilizing the principles of the present disclosure.
Figure 4C:
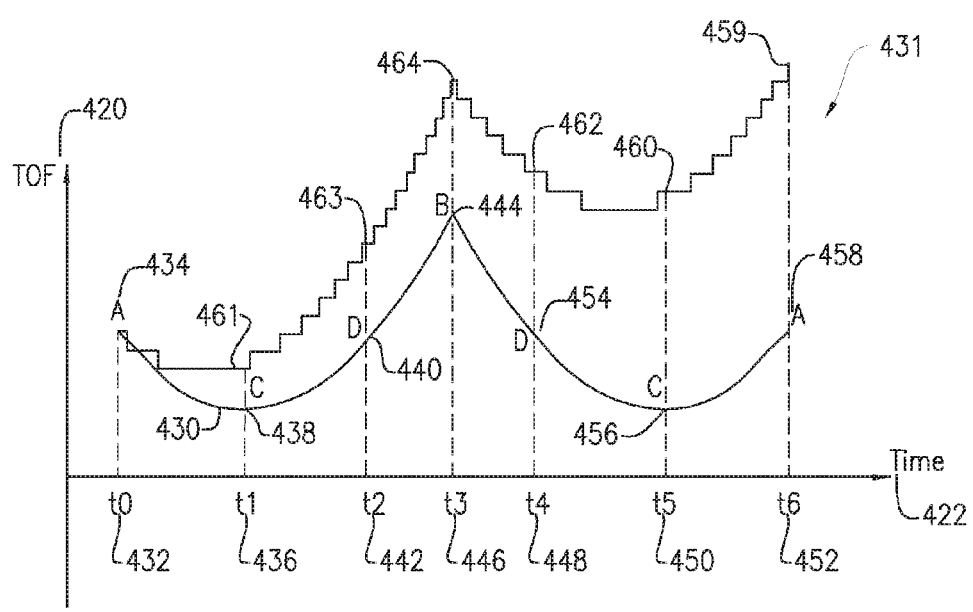
FIG. 4c is the graph depicted in FIG. 4b, including a graph of raw TOF measurements utilizing the principles of the present disclosure.

FIGS. 4a-4c describe an exemplary measurement process of the present disclosure and depict a scenario where a measuring receiver or measuring station 400, utilizing the principles of the present disclosure, is moving between points A 402 and B 404 on a path 406. FIG. 4a is a diagram of an example where a measuring station 400 is moving in a certain pattern 406 and measuring the TOAs of the beacons from a wireless device (WD) 120, which could be, for example, an AP. In this example, the station 400 starts at position A 402, and then moves to point B 404, via points C 408 and D 410. When the station 400 reaches point B 404, the station 400 reverses and travels back to point A 402, again via points C 408 and D 410. As station 400 moves along the path 406, station 400 is constantly measuring the TOA of the beacons that are transmitted by the wireless device 120. The distances between the measuring station 400 and the wireless device 120 when the station 400 is at points A 402, B 404, C 408 and D 410 are d1 412, d2 414, d3 416 and d4 418, respectively. If the time that each beacon is transmitted, the time of departure TOD, is known, then the time of flight TOF of the transmission is TOA-TOD. The TOF of the beacon transmission from wireless device 120, to the station 400 will be proportional to the distance between the station 400 and the wireless device 120 at each point. Many different patterns for the measuring station 400 may be used and the pattern depicted by path 406 is just one of many possible patterns.

FIG. 4b is a graph depicting the TOF axis 420 of the beacons transmitted by wireless device 120 as measured by the station 400 against time as shown by time axis 422. The station 400 periodically or continuously measures the TOA of the beacons from wireless device 120 as it moves from position A 402 to position B 404 and back. For the moment assume that the timers of the wireless device 120 and the measuring station 400 are perfectly aligned and the TOD of each beacon is known. The resulting graph 430 is the variation of TOF against time 420. The TOA measurements are carried out for every beacon transmission. At time t0 432, the station 400 measures the TOA for point A 402 and calculates TOF 434. At time t1 436, the station 400 measures the TOA for point C 408 and calculates TOF 438. Point C 408, in this example, is closer to the wireless device 120 than point A 402, and this is shown by TOF 438 which is less than TOF 434. Point D 410 is at a similar distance from the wireless device 120 as is point A 402 and hence the corresponding TOF 440, measured at time t2 442, is a similar value to TOF 434. Point B 404 is the furthest distance from the wireless device 120 and hence the TOF 444, measured at time t3 446 is greater than those measured at times t0 432, t1 436 and t2 442. After time t3 446, the measuring station 400 is moving back from point B 404 towards point A 402 and at times t4 448, t5 450 and t6 452, the TOFs 454, 456 and 458, corresponding to points D 410, C 408 and A 402 are again measured. The graph 430 in FIG. 4b of the measured TOF 420 against time 422 is ideal and assumes that the clocks at the wireless device 120 and the measuring station 400 are perfectly aligned. In practice this will not be the case and it is necessary for the relative clock drift and offset to be determined.

The graph 431 in FIG. 4c is a re-plot of the graph depicted in FIG. 4b, now allowing the timer on the wireless device 120 to not be aligned with the timer on the measuring station 400, but where a relative drift β of 0.1 ppm exists, and a zero offset a at the start time. Both TSF and TOA times are in increments of 1 µs, and a noiseless propagation environment is assumed. As time increases, the error in the TOF calculation progressively increases due to the 0.1 ppm relative drift between the measuring receiver and the wireless device timers. At time t6, 452, when the measuring receiver has returned to point A 402, first visited at time t0 432, the calculated TOF 459 is significantly in error compared to the true TOF 458. This error is directly related to the elapsed time (t6-t0) multiplied by the relative drift of 0.1 ppm. Similarly comparing the pairs of measurements where the receiving station 400 is at the same points, the calculated TOF 460 is larger than TOF 461 for point C 408, at times t5 450 and t1 436; the calculated TOF 462 is larger than TOF 463 for point D 410, at times t4 448 and t2 442; and when the measuring station 400 is at point B 404 the error is shown by the difference in the calculated TOF 464 and the true TOF 444. Of note, in the case that the actual relative drift was, say, 4 ppm, and if the relative drift is corrected to within 0.1 ppm, then there is still a significant error as shown in FIG. 4c. Hence the relative drift between the two timers must be compensated for as accurately as possible.

In the example depicted in FIGS. 4a-4c, the measuring station 400 periodically or continuously measures the TOAs of the beacons from the wireless device 120 as it moves along the path 406 and calculates the TOFs. If the TOA measurements and the TOF calculations are accurate, then the time differences between points can be calculated and the location of the wireless device 120 determined using a formula developed for TDOA location. Several such formulas are well known and the final calculation of the actual location, using the time differences, does not form part of this disclosure.

A method is proposed that determines the location of a target transmitting device, in a passive manner, using a single mobile measuring station 400. In one embodiment, the target wireless device is an access point 120 conforming to the IEEE 802.11 standard and the measuring station 400 may also be a device that conforms to the IEEE 802.11 standard. This disclosure is not restricted to the use of a single measuring device 400. Nor is this disclosure restricted to the application of the methods and arrangements herein to an AP. In other words, the methods and arrangements herein may be applied to any type of wireless device, of which an AP is one example.

One method of measuring the TOA of the beacon at the measuring station 400 is to use the internal TSF timer of the receiver of measuring station 400. In this case the TOA time would also be in 1 µs increments. It should be noted, however, that the method described in this disclosure may be extended to the use of two or more mobile measuring stations 400 and is not limited to just one. The mobile measuring station 400 may be located in a ground vehicle, a vessel at sea or on water or in a vehicle that is airborne.

In one embodiment, the disclosure relates to using the TSF timer in the beacon, the reported TOD, the TOA measurement by the measuring station 400, and the elimination of the relative drifts and offset, i.e., synchronization, between the timers of the wireless device 120 and the measuring station 400. In consideration that the timer on the wireless device 120 and the timer on the measuring station 400 are rarely aligned, three terms are defined herein: $\alpha$, representing the offset between the two timers at some time; $\beta$, representing the ratio of timer rates between the two timers at some time; and $\gamma$, representing the timewise change in timer rate ratio between the two timers at some time. This disclosure describes a process of recording the TOAs of beacons at several points together with the reported or scheduled TODs, estimating the travel times and then, using the known locations of the monitoring station 400, deriving an approximate location for the wireless device 120. To estimate the travel times, the wireless device 120 timer and the measuring station 400 timer must be synchronized. In one embodiment, a sum of square residuals (SSR) approach is then used to programmatically vary the wireless device latitude, wireless device longitude and the three moments $\alpha$, $\beta$, and $\gamma$ such that the smallest SSR results. This technique is termed "timer synchronization ranging" (TSR).

The time that a wireless device 120 transmits its beacon, TOD, may be included in the TSF field in the beacon transmission packet. Hence, the measuring station 400 that receives the beacon knows the time that the beacon is transmitted, the TOD, as measured by the wireless device's timer. Similarly, the time that the beacon was received, TOA, as measured by the measuring station's timer, is also known.

For the nth beacon:

$$TOAn = \alpha + \beta^* TODn + \gamma^* TODn^* TODn + \delta n \quad (1)$$

Rearranging equation (1) results in:

$$\delta n = TOAn - \alpha - \beta^* TODn - \gamma^* TODn^* TODn \quad (2)$$

where $\alpha$ is the offset between the TSF timer in the wireless device 120 and the timer in the measuring station 400, where $\beta$ is the timer rate ratio between the two timers, where $\gamma$ is the timewise change in timer rate ratio between the two timers and $\delta$ is the time delay, or travel time, due to the distance from the wireless device 120 to the measuring station 400. The parameters $\alpha$, $\beta$ and $\gamma$ are defined at reference time to.

Equation (2) may also be expressed as follows, where the travel time is TT:

$$TT = (TOAn - TODn) = (TSFn^{MS} - TSFo^{MS}) - \alpha - \beta^*(TSFn^{WD} - TSFo^{WD}) - \gamma^*(TSFn^{WD} - TSFo^{WD})^2 \quad (3)$$

where $TSFo^{WD}$ is the value of the TSF in the beacon sent by wireless device 120 at reference time to, and $TSFn^{WD}$ is the value of the TSF in the nth beacon. Where $TSFo^{MS}$ is the value of the TSF of the measuring station 400 at reference time to, and $TSFn^{MS}$ is the value of the TSF of the measuring station 400 for the nth beacon.

In practice, the timers in wireless device 120 and measuring station 400 have an accuracy in the order of 10 ppm or better, and hence, the value for $\beta$ may be initially estimated as unity. Similarly the initial estimate for $\gamma$ may be taken as zero. As beacons are received that are separated in time, better estimates may be obtained. In the case that $\gamma$ is zero, the value of $\beta$ may be determined, for the mth and nth beacons, as follows:

Using equation (1) $TOAn - TOAm = \beta(TODn - TODm) + (\delta n - \delta m)$

Rearranging: $\beta = [(TOAn - TOAm) - (\delta n - \delta m)]/(TODn - TODm) \quad (4)$ In equation (4) the term ($\delta n - \delta m$) is unknown but as it is the difference in travel times, may be initially considered to be small. Given an estimate for $\beta$, a value for $\alpha$ may be made, again using equation (1). As the time difference between received beacons increases, however, then the second order term $[\gamma^*(TSFn^{WD} - TSFo^{WD})^2]$ becomes significant even for small values of $\gamma$.

Rearranging equation (3), the meaning of the various moments, $\alpha$, $\beta$ and $\gamma$ can be identified:

$$TT = (TOAn - TODn) = [TSFn^{MS} - (TSFo^{MS} + \alpha)] - \beta^*(TSFn^{WD} - TSFo^{WD}) - \gamma^*(TSFn^{WD} - TSFo^{WD})^2 \quad (5)$$

where, $\alpha$ corrects the TSF of the measuring station 400 at time $TSF^{WD}$, $\beta$ corrects the ratio of the TSF frequency timers, and $\gamma$ corrects for changes in the ratio of frequency drifts in either TSF timer There are a variety of techniques for determining the best estimate for the wireless device 120 location, including minimization of the sum of square residuals (SSR), Bayesian statistics, genetic algorithms, etc. Without restricting the content of this disclosure to any particular technique, the minimization of SSR method will be used in the ensuing discussion. The exact location of the measuring station 400 is known, hence the distance to the wireless device 120, D, is:

$$D^2 = (latitude^{WD} - latitude^{MS}) + (longitude^{WD} - longitude^{MS})^2 + (altitude^{WD} - altitude^{MS})^2 \quad (6)$$

where the latitudes, longitudes and altitudes are converted to distances, for example in meters.

The sum of square residuals (SSR) approach can be used to programmatically vary the wireless device 120 latitude and wireless device 120 longitude such that the distance D from the wireless device 120 to the measuring station 400 most closely matches the travel time. That is, the SSR for a variety of geographic locations, i, where the wireless device 120 beacons have been observed, $SSR=\Sigma i[Di-c*TTi]^2$, is minimized by varying latitude$^{WD}$, longitude$^{WD}$, $\alpha$, $\beta$ and $\gamma$ such that SSR has the smallest value.

Figure 5:
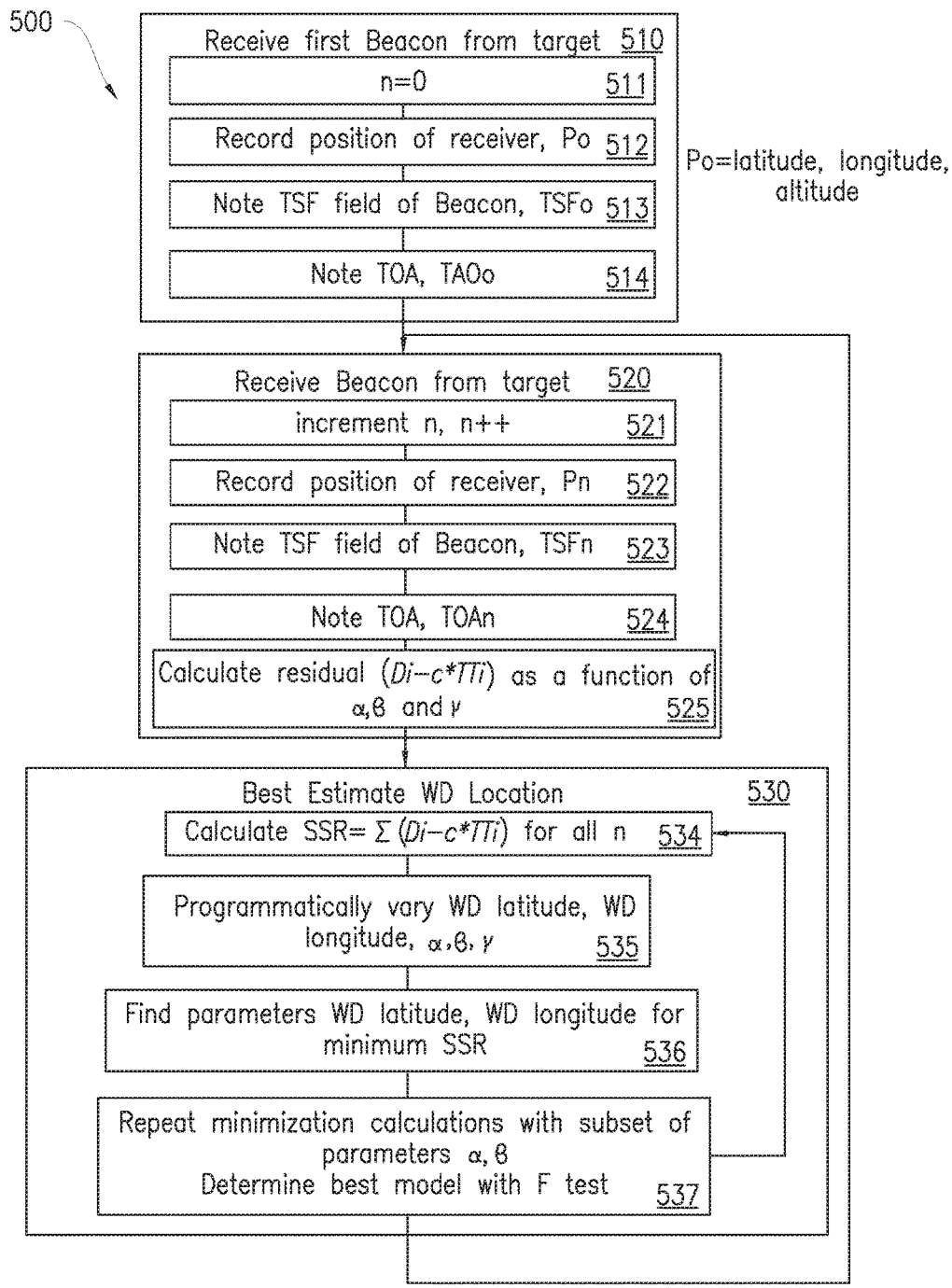
FIG. 5 is a flowchart depicting an exemplary method for locating a wireless device utilizing the principles of the present disclosure.

FIG. 5 illustrates exemplary method 500 performed by a measuring station 400 according to an embodiment of the disclosure. Method 500 may start by stage 510 with the reception of the first beacon from the wireless device 120 by the measuring station 400. Stage 510 may include stage 511 where the beacon reference, n, is initialized. The value of n may be set to 0. Stage 510 may include stage 512 where the position, Po, latitude, longitude, altitude of the measuring station 400 is recorded corresponding to the point in time that the beacon was received in stage 510. The position P0 may be obtained by various means such as a GPS receiver, or a navigation system that may be or may not be part of the measuring station 400. Stage 510 may also include stage 513 where the value of the TSF field in the received beacon is noted and recorded, TSFo. Stage 510 may also include stage 514 where the value of the TOA of the received beacon, as measured by the measuring station 400, is noted and recorded, TOAo.

Stage 510 may be followed by stage 520 with the reception of further beacons by the measuring station 400. Stage 520 may include stage 521 where the beacon reference n is incremented. Stage 520 may include stage 522 where the position in space, Pn, latitude, longitude and altitude of the measuring station 400 is recorded, corresponding to the point in time that the beacon was received in stage 512 included in stage 510. Stage 520 may include stage 523 where the value of the TSF field in the received beacon is noted and recorded, TSFn. Stage 520 may include stage 524 where the value of the time of arrival, TOA, of the received beacon, as measured by the measuring station 400, is noted, TOAn. Stage 520 may include stage 525 where the travel time, TTn, is estimated as previously described using equation (5). This may be used to calculate the residual for a given wireless device latitude, wireless device longitude, $\alpha$, $\beta$ and $\gamma$.

Stage 520 may be followed by stage 530 where the best estimate of the wireless device 120 location is calculated. This is a programmatic approach which may consist of stages 534 to 536. Stage 530 may include stages 534 where the SSR is calculated. Stage 530 may include stage 535 where the values for the wireless device latitude, wireless device longitude, $\alpha$, $\beta$ and $\gamma$ are varied. Stage 530 may include stage 536 where the wireless device longitude and latitude parameters for minimum SSR values are determined. Stage 530 may include stage 537 where a second set of SSR values are calculated with the parameters $\alpha$, $\beta$, while setting parameter $\gamma$ to zero. The results are then compared with the first set using any of a number of known statistical techniques such as an F test to determine the best model. Hence, if setting the value of $\gamma$ to zero provides an equally good match then the parameter $\gamma$ may be ignored. The function of stage 530 is to determine the best fit values for wireless device latitude and longitude.

The SSR approach not only determines the best fit values for the variables but it also determines the covariance matrix which can be converted into a confidence ellipse for the location of the wireless device 120, latitude and longitude. Better results for the accuracy of the location are obtained when there is a diversity of locations of the measuring station 400 with detection of the beacons. Ideally, the measuring station 400 should traverse a full orbit around the wireless device 120 and measurements are made at opposite sides of the orbit. Good results are achieved if measurements are made over at least one quarter of an orbit. The effect of including the second moment term $\gamma$ becomes more noticeable as the time of the data collection increases. Attempts to use higher moments than $\gamma$ have resulted in non-convergence of the minimization of the SSR. It has been found that with relative timer drifts as low as 0.01 Hz per day the inclusion of the second order term $\gamma$ results in significantly improved location accuracy. Values as high a 40 Hz per day have been observed. The inclusion of an F test can be used to determine if the second order term $\gamma$ is necessary. This test becomes more important as the measuring time increases.

Figure 6:
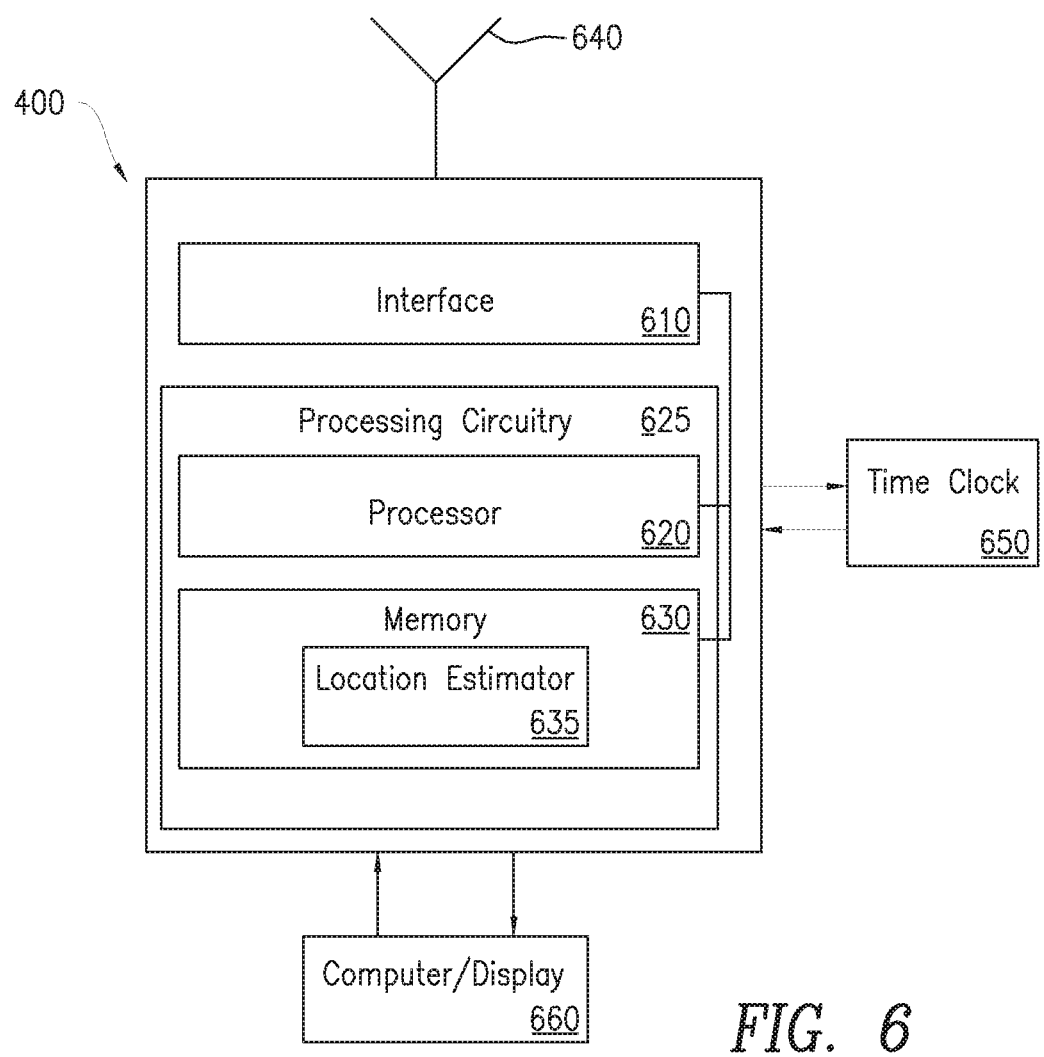
FIG. 6 illustrates an exemplary embodiment of a wireless communication device that may be used as the measuring station utilizing the principles of the present disclosure.

FIG. 6 illustrates an exemplary wireless communication device, such as measuring station 400, according to embodiments of the present disclosure.

Measuring station 400 may be any device capable of wirelessly receiving signals and can execute any of the methods illustrated in the present disclosure. It may be a station, an access point, or the like. It may be a wireless device that is based upon the IEEE 802.11 specification. Measuring station 400 includes interface 610, processing circuitry 625, which includes processor 620, and memory 630, and one or more wireless antennas such as wireless antennas 640. In addition to a traditional processor and memory, processing circuitry 625 may comprise integrated circuitry for processing and/or control, e.g., one or more processors and/or processor cores and/or FPGAs (Field Programmable Gate Array) and/or ASICs (Application Specific Integrated Circuitry). Processor 625 may be configured to access (e.g., write to and/or reading from) memory 630, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 630 may be configured to store code executable by processor 620 and/or other data, e.g., data pertaining to communication, e.g., configuration and/or address data of nodes, etc.

Processing circuitry 625 may be configured to control any of the methods and/or processes described herein and/or to cause such methods and/or processes to be performed, e.g., by measuring station 400. Corresponding instructions may be stored in the memory 630, which may be readable and/or readably connected to processor 620. In other words, processing circuitry 625 may comprise a microprocessor and/or microcontroller and/or FPGA (Field-Programmable Gate Array) device and/or ASIC (Application Specific Integrated Circuit) device.

Memory may include location estimator 635 configured to estimate a location of wireless device 120 based on such factors as the estimated travel time of the first beacon, and the synchronization of the first timer associated with the wireless device 120 and the timer associated with the measuring receiver 400. Measuring station 400 may also include a timer 650 and a computer display 660. Timer 650 may be part of measuring station 400 or may be a separate external block. Interface 610 may be a wireless receiver, or a combination of a wireless transmitter and receiver. It may include, for example, at least a part of an analog and/or digital front end of a receiver, a transmitter or a combination thereof.

Interface 610 and/or processor 620 may include measurement elements for measuring and/or calculating attributes of received signals (input signals, transmissions). Interface 610 and/or processor 620 may include monitoring elements for monitoring attributes of received signals.

According to an embodiment of the disclosure, interface 610 is arranged to receive input signals and processor 620 is arranged to measure and monitor an input signal's attribute, namely the beacon packet transmitted by an access point that is based upon the IEEE 802.11 standard. Memory 630 may store instructions for executing any method mentioned in the specification, input signals and results of processing of processor 620, signals to be outputted and the like.

According to an embodiment of the disclosure, interface 610 is arranged to receive transmissions of another wireless device 120 and processor 620 is arranged to monitor an attribute of the beacon transmissions of wireless device 120, and determine the value of the TSF field in the beacons of wireless device 120. In addition, according to an embodiment of the disclosure interface 610 is arranged to measure the time of arrival of the received beacon transmissions of wireless device 120. This may be accomplished by outputting the value of the TSF timer of measuring station 400 that corresponds to a precise point in time when the beacon was received. In one embodiment, this point in time may correspond to the time when the frame check is completed. In other embodiments, the point in time may be taken at various other points in the received beacon, for example the time when the clear channel assessment (CCA) of measurement station 400 was exerted by the beacon reception, or the point where the header of the beacon is verified. This timing may also be accomplished by outputting a trigger that is timed to coincide with the reception of the beacon from wireless device 120. This trigger may correspond to any known point within the reception of the beacon. This trigger may then be used to read the time from timer 650. Timer 650 may have a precision that is higher than the internal TSF timer that is part of the measuring station 400.

According to an embodiment of the disclosure, computer/display 660 may be connected to measuring station 400. Computer/display 660 may be a computer system with an associated display module such as a laptop or tablet computer or may be a computer system with a separate display monitor. Computer/display 660 may be used as an operator interface to measuring station 400 and to display the location of wireless devices 120 on a digital grid or map. The calculations described in this disclosure may be performed using software on the computer/display 660, the required timing information being provided by an interconnection link with measuring station 400.

In some embodiments, a measuring station 400 for determining a location of a wireless access point 120 is provided. The measuring station 400 includes an interface 610 configured to receive a plurality of beacons from the wireless access point 120, and processing circuitry 625 including a memory 630 and a processor 620, the memory 630 in communication with the processor 620, the memory 630 having instructions that, when executed by the processor 620, configure the processor 620 to perform a variety of tasks. In one embodiment, these tasks include identifying a plurality of TODs of a corresponding plurality of beacons received at measuring station 400, each of the plurality of TODs indicating when the wireless access point 120 transmitted a beacon to the measuring station 400 according to a timer associated with the wireless access point 120, identifying a plurality of TOAs corresponding to the plurality of beacons at the measuring station 400 according to a timer associated with the measuring station 400, synchronizing the timer associated with the wireless access point 120 with the timer associated with the measuring station 400. The synchronizing includes applying a factor α for correcting the timer associated with the measuring station 400 when the measuring station 400 receives the plurality of beacons, applying a factor β for correcting a ratio of timer rates between the timer associated with the wireless access point 120 and the timer associated with the measuring station 400, and applying a factor γ for correcting changes in a timer rate ratio between the first timer associated with the wireless access point 120 and the timer associated with the measuring station 400. The processor is further configured to determine a plurality of TTS corresponding to the plurality of beacons, the plurality of TTs based at least in part upon the plurality of TODs, the plurality of TOAs, and the synchronization of the timer associated with the wireless access point 120 and the timer associated with the measuring station 400, and to determine a location of the wireless access point 120 based at least in part on the determined plurality of TTs, and the synchronization of the timer associated with the wireless access point 120 and the timer associated with the measuring station 400.

In this embodiment, determining the location of the wireless access point 120 includes obtaining a plurality of estimated distances Di between the wireless access point 120 and the measuring station 400 for a plurality of geographic locations i by varying at least one of an estimated longitude of the wireless access point 120, an estimated latitude of the wireless access point 120 and an estimated altitude of the wireless access point 120, calculating a lowest sum of square residuals (SSR) value according to SSR=Σi [Di−c*TTi]2, where c is a speed of light and TTi is a travel time of a first beacon sent by the wireless access point at geographic location i, selecting a distance D of the plurality of estimated distances Di between the wireless access point 120 and the measuring station 400 corresponding to the lowest SSR value, and determining the location of the wireless access point 120 based at least in part on the selected distance D between the wireless access point 120 and the measuring station 400.

In this embodiment, determining the plurality of TTs is determined according to: $TT=[TSFn^{MS}-(TSFo^{MS}+\alpha)]-\beta*(TSFn^{WD}-TSFo^{WD})-\gamma*(TSFn^{WD}-TSFo^{WD})^2$, where, $TSFn^{MS}$ is a value of the timer associated with the measuring station 400 when an nth beacon arrives at the measuring station 400, $TSFo^{MS}$ is a value of the timer associated with the measuring station 400 when the first beacon arrives at the measuring station 400, $TSFn^{WD}$ is a value of a timer synchronization value (TSF) field in the nth beacon sent by the wireless access point 120, and $TSFo^{WD}$ is a value of the TSF in the first beacon sent by the wireless access point 120.

Figure 7:
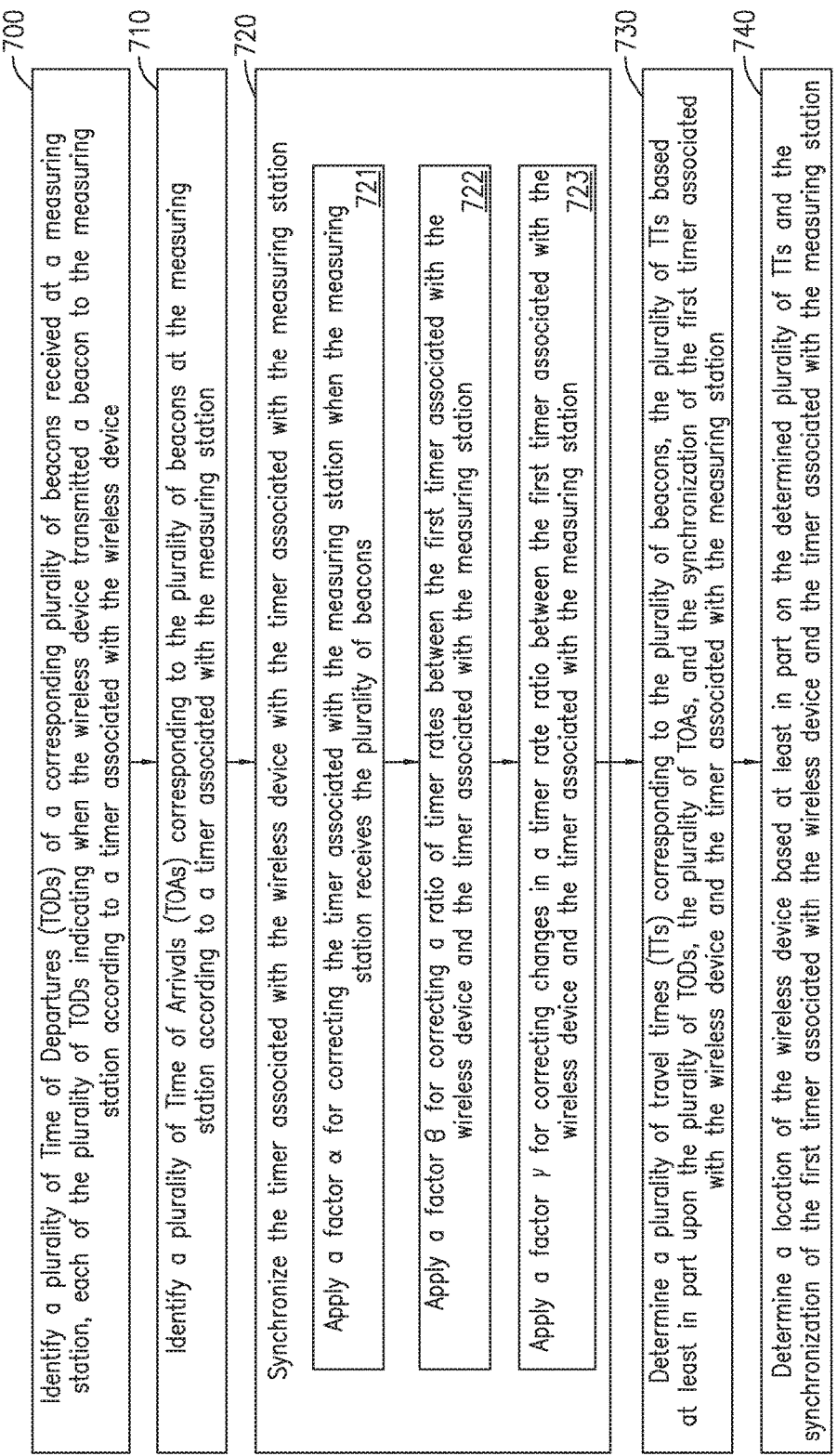
FIG. 7 is a flowchart depicting another exemplary method for locating a wireless device utilizing the principles of the present disclosure.

FIG. 7 is a flow diagram illustrating another exemplary embodiment of the method of the present disclosure. In stage 700, processor 620 of measuring station 400, identifies a plurality of Time of Departures (TODs) of a corresponding plurality of beacons received at interface 610 of the measuring station 400, each of the plurality of TODs indicating when the wireless device 120 transmitted a beacon to the measuring station 400 according to a timer associated with the wireless device 120. In stage 710, processor 620 identifies a plurality of Time of Arrivals (TOAs) corresponding to the plurality of beacons at interface 610 of the measuring station 400 according to a timer associated with the measuring station 400. In stage 720, processor 620 synchronizes the timer associated with the wireless device 120 with the timer associated with the measuring station 400. In some embodiments, the synchronizing includes stage 721, where processor 620 applies a factor α for correcting the timer associated with the measuring station 400 when the measuring station receives the plurality of beacons, stage 722, where processor 620 applies a factor β for correcting a ratio of timer rates between the timer associated with the wireless device 120 and the timer associated with the measuring station 400, and stage 723, where processor 620 applies a factor γ for correcting changes in a timer rate ratio between the timer associated with the wireless device 120 and the timer associated with the measuring station 400. In stage 730, processor 620 determines a plurality of travel times (TTs) corresponding to the plurality of beacons, the plurality of TTs based at least in part upon the plurality of TODs, the plurality of TOAs, and the synchronization of the timer associated with the wireless device 120 and the timer associated with the measuring station 400. In stage 740, processor 620 determines a location of the wireless device 120 based at least in part on the determined plurality of TTs and the synchronization of the timer associated with the wireless device 120 and the timer associated with the measuring station 440.

In some embodiments, determining the travel time of the plurality of TTs is determined according to: $TT=[TSFn^{MS}-(TSFo^{MS}+\alpha)]-\beta*(TSFn^{WD}-TSFo^{WD})-\gamma*(TSFn^{WD}-TSFo^{WD})^2$, where, $TSFn^{MS}$ is a value of the timer associated with the measuring station 400 when an nth beacon arrives at the measuring station 400, $TSFo^{MS}$ is a value of a timer associated with the measuring station 400 when a first beacon arrives at the measuring station 400, $TSFn^{WD}$ is a value of a timer synchronization function (TSF) field in the nth beacon sent by the wireless device 120, and $TSFo^{WD}$ is a value of the TSF field in the first beacon sent by the wireless device 120.

In some embodiments, processor 620 is further configured to determine an alternate plurality of travel times ($TT_2$) as determined according to: $TT_2=[TSFn^{MS}-(TSFo^{MS}+\alpha)]-\beta*(TSFn^{WD}-TSFo^{WD})$, compare $TT_2$ with TT, and determine the location of the wireless device using at least in part one of $TT_2$ and TT.

In some embodiments, determining the location of the wireless device includes obtaining a plurality of estimated distances Di between the wireless device 120 and the measuring station 400 for a plurality of geographic locations i by varying at least one of an estimated longitude of the wireless device 120, an estimated latitude of the wireless device 120 and an estimated altitude of the wireless device 120, calculating a lowest sum of square residuals (SSR) value according to $SSR=\Sigma i[Di-c*TTi]^2$, where c is a speed of light and TTi is a travel time of a beacon sent by the wireless device at geographic locations i, selecting a distance D of the plurality of estimated distances Di between the wireless device 120 and the measuring station 400 corresponding to the lowest SSR value, and determining the location of the wireless device 400 based at least in part on the selected distance D between the wireless device 120 and the measuring station 400.

In some embodiments, at least one of the plurality of beacons includes a timer synchronization function (TSF) field containing a corresponding TOD of the plurality of TODs. In some embodiments, the measuring station 400 is located in one of a ground vehicle, a vessel in a body of water, and an airborne vehicle. In some embodiments, at least one of the plurality of TOAs is identified as a time when a frame check of a corresponding received beacon is completed.

In some embodiments, the plurality of beacons are received by the measuring station 400 as the measuring station 400 travels in an orbit around the wireless device 120. In one embodiment, the beacons of the plurality of beacons are received at the measuring station at opposite sides of the orbit.

Figure 8A:
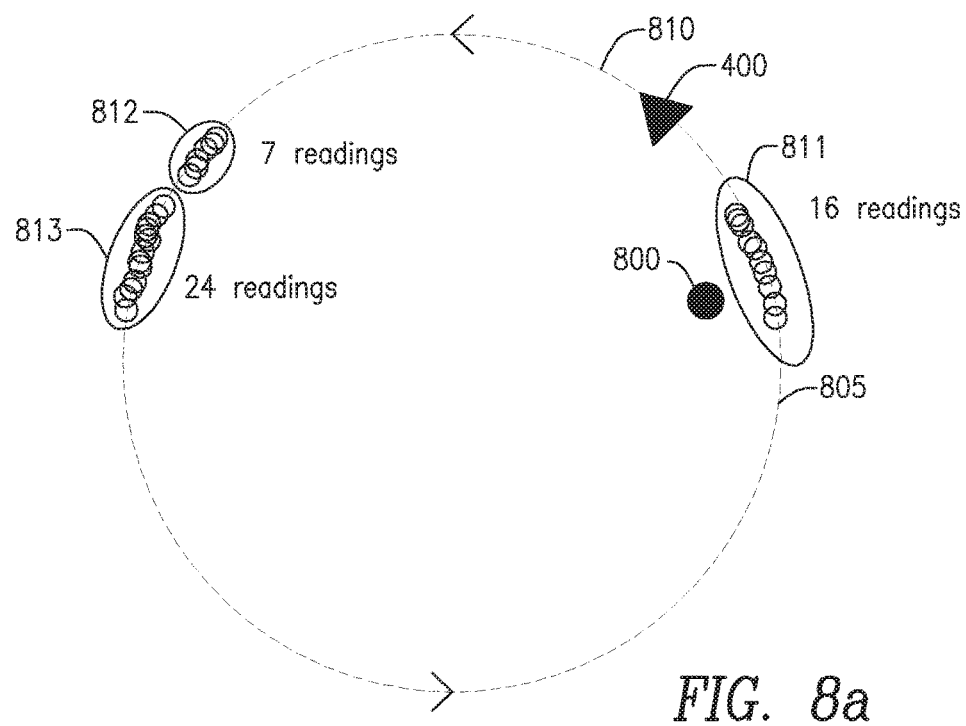
FIG. 8a is an exemplary diagram of an actual trial of a first orbit of a measuring station located in an airborne platform moving in a circular pattern monitoring beacons from a wireless device utilizing the principles of the present disclosure.
Figure 8B:
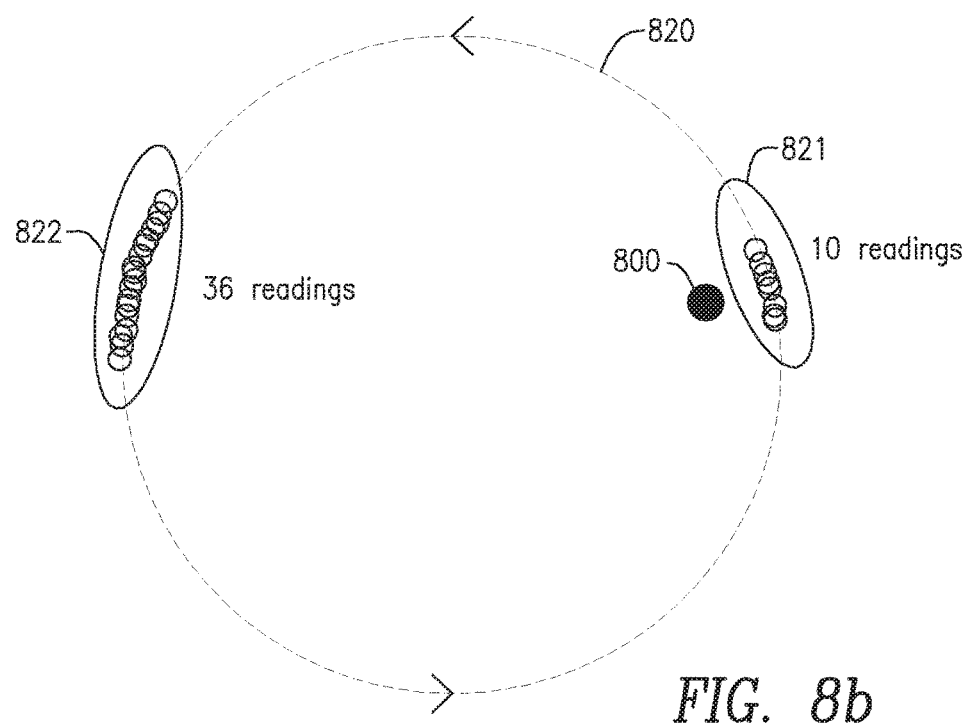
FIG. 8b is an exemplary diagram of an actual trial of a second orbit of a measuring station located in an airborne platform moving in a circular pattern monitoring beacons from a wireless device utilizing the principles of the present disclosure.
Figure 8C:
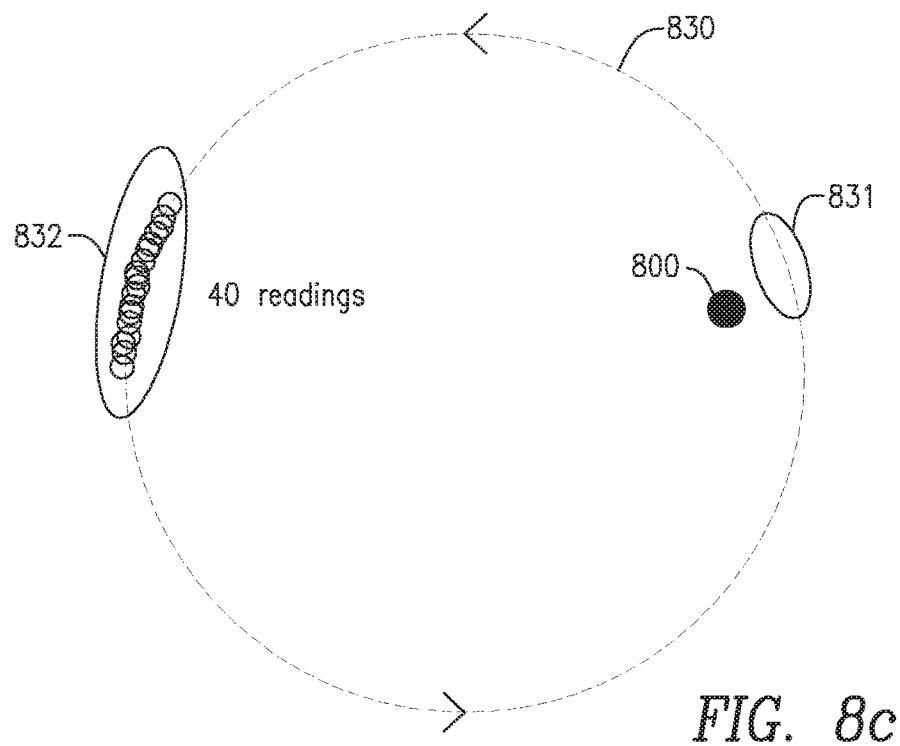
FIG. 8c is an exemplary diagram of an actual trial of a third orbit of a measuring station located in an airborne platform moving in a circular pattern monitoring beacons from a wireless device utilizing the principles of the present disclosure.
Figure 8D:
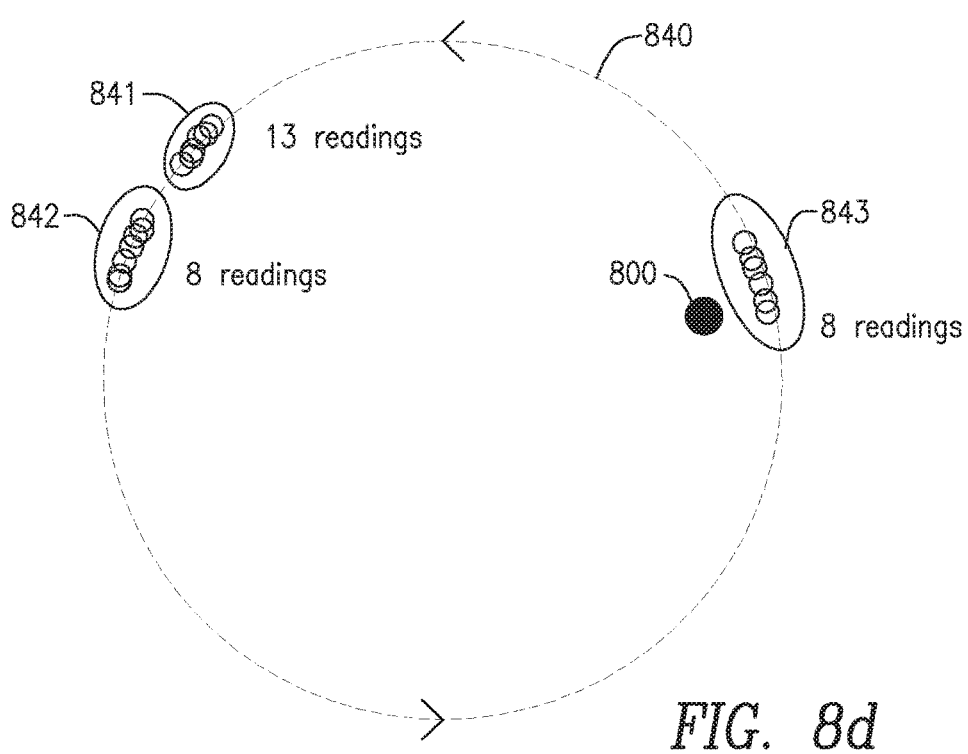
FIG. 8d is an exemplary diagram of an actual trial of a fourth orbit of a measuring station located in an airborne platform moving in a circular pattern monitoring beacons from a wireless device utilizing the principles of the present disclosure.

FIG. 8a, FIG. 8a, FIG. 8c and FIG. 8d are exemplary diagrams of an actual trial of a measuring station 400 located in an airborne platform which is moving in a circular pattern monitoring beacons from a wireless device 120 located at point 800. FIG. 8a depicts the first orbit 810 of the measuring station 400. The first orbit 810 starts at point 805. At segment 811 the measuring station 400 received 16 beacon readings. At segment 812 the measuring station 400 received 7 beacon readings, and at segment 813, the measuring station 400 received 24 beacon readings. At no other points on the first orbit does the measuring station 400 receive beacons from the wireless device 120 located at point 800. In practice it is a common occurrence that beacons are only received at certain relative locations. This may be due to obstructions, and/or interference.

FIG. 8b depicts the second orbit 820 of the measuring station 400. At segment 821 the measuring station 400 received 10 beacon readings, and at segment 822, the measuring station 400 received 36 beacon readings from the wireless device 120 located at point 800. Note that segment 821 is at a similar location to segment 811 and that segment 822 is at a similar location to segments 812 and 813 but that there was no break in reception as was the case with segments 812 and 813.

FIG. 8c depicts the third orbit 830 of the measuring station. At segment 832 the measuring station 400 received 40 beacon readings. Note that segment 832 is at a similar location to segment 822. It may be noted that in the third orbit 830, no beacon readings were received from the wireless device 120 located at point 800 when the measuring station 400 was passing through the segment 831 which corresponds to segments 821 and 811. This may be due to the momentary relative momentary positioning of the antenna of the measuring station 400 which may be affected by tilting of the platform.

FIG. 8d depicts the fourth orbit 840 of the measuring station. At segment 841 the measuring station 400 received 13 beacon readings, at segment 842 the measuring station 701 received 8 beacon readings, and at segment 843, the measuring station 701 receives 8 beacon readings. It may be noted that in time, the beacons received in segment 843 are after those received from segment 842.

Figure 9:
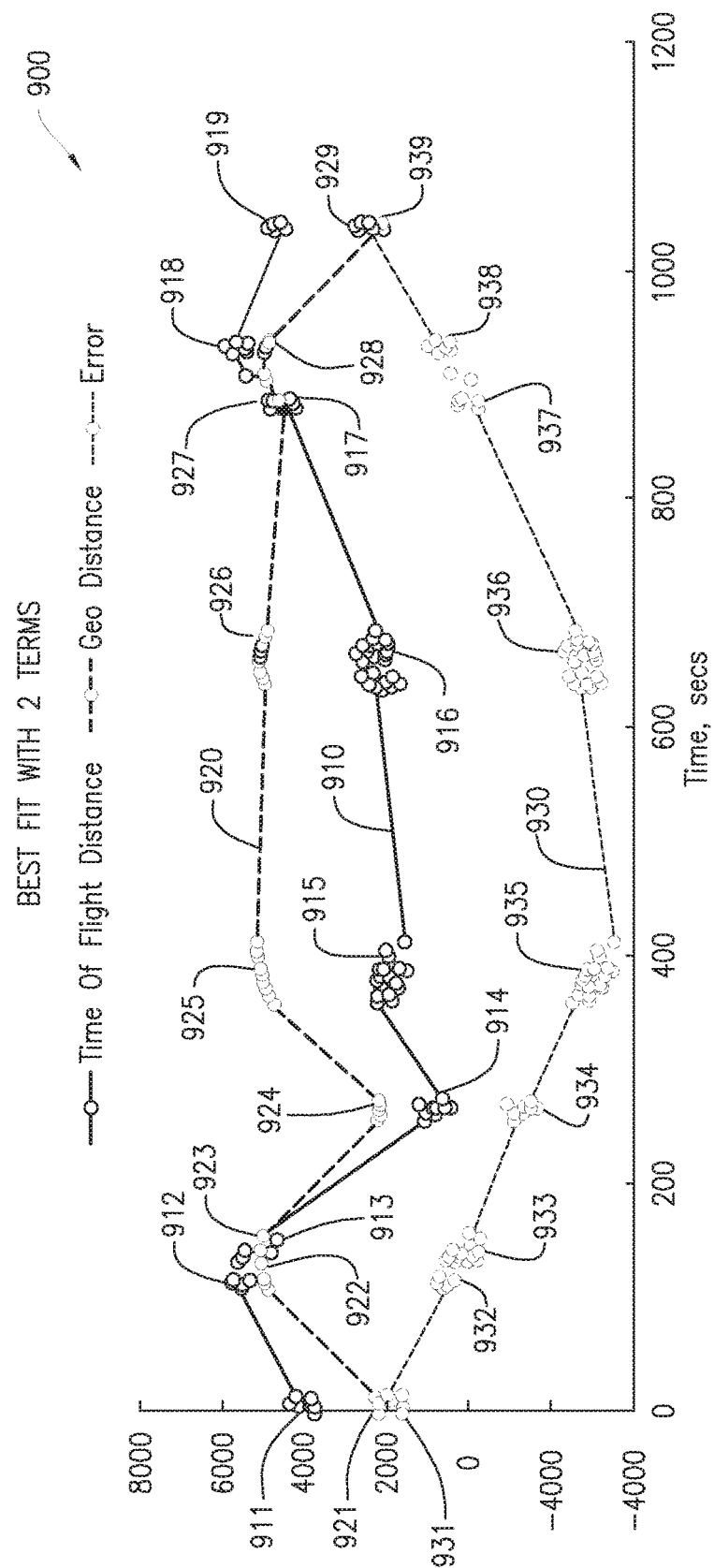
FIG. 9 is a graphical representation of the results of a reading taken from the trial depicted in FIGS. 8a, 8b, 8c and 8d when two terms, parameters α and β, are used in the calculations.

FIG. 9 is a graphical representation 900 of the results of the reading taken from the trial described in FIGS. 8A, 8B, 8C and 8D when two terms, parameters α and β are used in the calculations. The horizontal x-axis is in time and the vertical y-axis is in meters. Three sets of results are shown: TimeOfFlightDistance 910, GeoDistance 920 and Error 930. TimeOfFlightDistance 910 is the calculated distance of the wireless device 120 located at point 800 to the measuring station 400. GeoDistance 920 is the actual distance of the wireless device 120 located at point 800 to the measuring station 400. Error 930 is the difference between the TimeOfFlightDistance 910 and the GeoDistance 920. The graphs are the results at the end of the fourth orbit when the correction parameters α and β have been calculated and the best fit to the readings applied. The TimeOfFlightDistance 910 results comprise the block of values 911, 912, 913, 914, 915, 916, 917, 918 and 919 which correspond to the readings taken at segments 811, 812, 813, 821, 822, 832, 841, 842 and 843 respectively. Similarly the GeoDistance 920 results comprise the block of values 921, 922, 923, 924, 925, 926, 927, 928 and 929 which also correspond to the readings taken at segments 811, 812, 813, 821, 822, 832, 841, 842 and 843 respectively. The Error 930 results comprise values 931, 932, 933, 934, 935, 936, 937, 938 and 939, representing the difference between the TimeOfFlightDistance 910 and Geo- Distance 920 are similarly calculated corresponding to the segments 811, 812, 813, 821, 822, 832, 841, 842 and 843. As may be seen from the results, the resulting Error 930 is an inverted curve and the values vary up to over 3000 m as the values for the actual distance, GeoDistance 920, and the calculated distance, TimeOfFlightDistance 910, do not generally agree over most of the time. These values represent the best fit resulting from using just two parameters, $\alpha$ and $\beta$. The similarity of the curved error in graph 830 to a parabola can be accounted for if the ratio of timer rates is not constant but is changing linearly with time. For informational purposes only the actual calculated values for the best fit were $\alpha=0.0789467\ldots$ days and $\beta=2.46598\ldots$ Hz. The final calculation of the location of the wireless device 120 in this case was in error by 2000 m.

Figure 10:
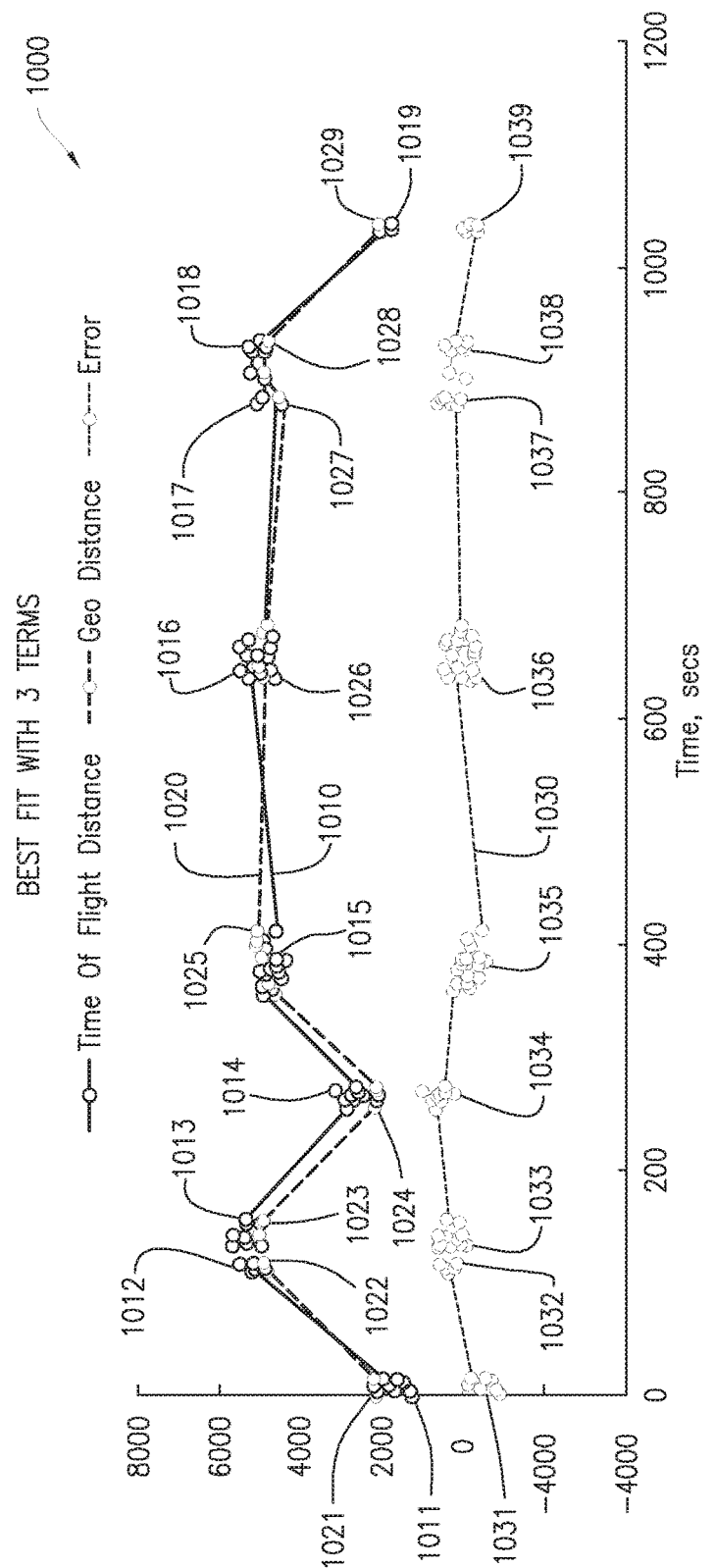
FIG. 10 is a graphical representation of the results of a reading taken from the trial depicted in FIGS. 8a, 8b, 8c and 8d when three terms, parameters α, β, and γ are used in the calculations.

FIG. 10 is a graphical representation 1000 of the results of the reading taken from the trial described in FIGS. 8A, 8B, 8C and 8D when three terms, parameters $\alpha$, $\beta$ and $\gamma$ are used in the calculations. The horizontal x-axis is in time and the vertical y-axis is in meters. Again, three sets of results are shown: TimeOfFlightDistance 1010, GeoDistance 1020 and Error 1030. The TimeOfFlightDistance 1010 results comprise the block of values 1011, 1012, 1013, 1014, 1015, 1016, 1017, 1018 and 1019 which correspond to the readings taken at segments 811, 812, 813, 821, 822, 832, 841, 842 and 843 respectively. The GeoDistance 1020 results are the same as shown in FIG. 9 and comprise the block of values 1021, 1022, 1023, 1024, 1025, 1026, 1027, 1028 and 1029 which also correspond to the readings taken at segments 811, 812, 813, 821, 822, 832, 841, 842 and 843 respectively. The Error 1030 results, 1031, 1032, 1033, 1034, 1035, 1036, 1037, 1038 and 1039, representing the difference between the TimeOfFlightDistance 1010 and GeoDistance 1020 are similarly calculated corresponding to the segments 811, 812, 813, 821, 822, 832, 841, 842 and 843. As may be seen from the results, GeoDistance 1020, and the calculated distance, TimeOfFlightDistance 1010, do generally agree well over the time. These values represent the best fit resulting from using just three parameters, $\alpha$, $\beta$ and $\gamma$ and in comparison with the results shown in FIG. 9 the benefit of calculating the third term $\gamma$ is clear. For informational purposes only the actual calculated values for the best fit were $\alpha=0.0789467\ldots$ days (the same value as for FIG. 8), but now $\beta=2.39109\ldots$ Hz and $\gamma=-6.28198\ldots$ Hz/day. The final calculation of the location of the wireless device 120 in this case was in error by 125 m.

As will be appreciated by one of skill in the art, the concepts described herein may be embodied as a method, data processing system, and/or computer program product. Accordingly, the concepts described herein may take the form of an entirely hardware embodiment, e.g., application specific integrated circuit (ASIC), programmable gate array (PGA), etc., an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the use of more than one measuring device or receiver, the details of the formulas used that include the three correction terms, the essence being that the method disclosed uses the first three moments of the relative timing between the wireless device and the measuring station, the methods for carrying out the SSR approach, the details of the measuring station, the method of measuring the time of arrival, the use of the internal TSF timer and an external time source to increase the accuracy, the use of more than one measuring station. Accordingly the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method of determining a location of a wireless device, the method comprising:
    identifying a plurality of Time of Departures (TODs) of a corresponding plurality of beacons received at a measuring station, each of the plurality of TODs indicating when the wireless device transmitted a beacon to the measuring station according to a timer associated with the wireless device;
    identifying a plurality of Time of Arrivals (TOAs) corresponding to the plurality of beacons at the measuring station according to a timer associated with the measuring station;
    synchronizing the timer associated with the wireless device with the timer associated with the measuring station, the synchronizing comprising:
        applying a factor $\alpha$ for correcting the timer associated with the measuring station when the measuring station receives the plurality of beacons;
        applying a factor $\beta$ for correcting a ratio of timer rates between the timer associated with the wireless device and the timer associated with the measuring station; and
        applying a factor $\gamma$ for correcting changes in a timer rate ratio between the timer associated with the wireless device and the timer associated with the measuring station;
    determining a plurality of travel times (TTs) corresponding to the plurality of beacons, the plurality of TTs based at least in part upon the plurality of TODs, the plurality of TOAs, and the synchronization of the timer associated with the wireless device and the timer associated with the measuring station, the plurality of TTs being determined according to: $TT=[TSFn^{MS}-(TSFo^{MS}+\alpha)]-\beta*(TSFn^{WD}-TSFo^{WD})-\gamma*(TSFn^{WD}-TSFo^{WD})^2$, where, $TSFn^{MS}$ is a value of the timer associated with the measuring station when an nth beacon arrives at the measuring station, $TSFo^{MS}$ is a value of the timer associated with the measuring station when a first beacon arrives at the measuring station, $TSFn^{WD}$ is a value of a timer synchronization function (TSF) field in the nth beacon sent by the wireless device, and $TSFo^{WD}$ is a value of the TSF field in the first beacon sent by the wireless device; and
    determining a location of the wireless device based at least in part on the determined plurality of TTs and the synchronization of the timer associated with the wireless device and the timer associated with the measuring station.

2. The method of claim 1, further comprising:
    determining an alternate plurality of travel times ($TT_2$) of the plurality of beacons as determined according to: $TT_2=[TSFn^{MS}-(TSFo^{MS}+\alpha)]-\beta*(TSFn^{WD}-TSFo^{WD})$;
    comparing $TT_2$ with TT; and
    determining the location of the wireless device using at least in part a selected one of $TT_2$ and TT.

3. The method of claim 1, wherein determining the location of the wireless device comprises:
    obtaining a plurality of estimated distances Di between the wireless device and the measuring station for a plurality of geographic locations i by varying at least one of an estimated longitude of the wireless device, an estimated latitude of the wireless device and an estimated altitude of the wireless device;
    calculating a lowest sum of square residuals (SSR) value according to $SSR=\Sigma i[Di-c*TTi]^2$, where c is a speed of light and TTi is a travel time of a beacon sent by the wireless device at geographic location i;
    selecting a distance D of the plurality of estimated distances Di between the wireless device and the measuring station corresponding to the calculated lowest SSR value; and
    determining the location of the wireless device based at least in part on the selected distance D between the wireless device and the measuring station.

4. The method of claim 1, wherein at least one of the plurality of beacons includes a timer synchronization function (TSF) field containing a corresponding TOD of the plurality of TODs.

5. The method of claim 1, wherein the measuring station is located in one of a ground vehicle, a vessel in a body of water and an airborne vehicle.

6. The method of claim 1, where at least one of the plurality of TOAs is identified as a time when a frame check of a corresponding received beacon is completed.

7. The method of claim 1, wherein the plurality of beacons are received by the measuring station as the measuring station travels in an orbit around the wireless device.

8. The method of claim 7, wherein beacons of the plurality of beacons are received at the measuring station at opposite sides of the orbit.

9. A measuring station for determining a location of a wireless device, the measuring station comprising:
    an interface configured to receive a plurality of beacons from the wireless device; and
    processing circuitry including a memory and a processor, the memory in communication with the processor, the memory having instructions that, when executed by the processor, configure the processor to:
        identify a plurality of Time of Departures (TODs) of a corresponding plurality of beacons received at the measuring station, each of the plurality of TODs indicating when the wireless device transmitted a beacon to the measuring station according to a timer associated with the wireless device;
        identify a plurality of Time of Arrivals (TOAs) corresponding to the plurality of beacons at the measuring station according to a timer associated with the measuring station;
        synchronize the timer associated with the wireless device with the timer associated with the measuring station, the synchronizing comprising:
            applying a factor $\alpha$ for correcting the timer associated with the measuring station when the measuring station receives the plurality of beacons;
            applying a factor $\beta$ for correcting a ratio of timer rates between the timer associated with the wireless device and the timer associated with the measuring station; and
            applying a factor $\gamma$ for correcting changes in a timer rate ratio between the timer associated with the wireless device and the timer associated with the measuring station;

determine a plurality of travel times (TTs) corresponding to the plurality of beacons, the plurality of TTs based at least in part upon the plurality of TODs, the plurality of TOAs, and the synchronization of the timer associated with the wireless device and the timer associated with the measuring station, the plurality of TTs being determined according to: $TT=[TSFn^{MS}-(TSFo^{MS}+\alpha)]-\beta*(TSFn^{WD}-TSFo^{WD})-\gamma*(TSFn^{WD}-TSFo^{WD})^2$, where, $TSFn^{MS}$ is a value of the timer associated with the measuring station when an nth beacon arrives at the measuring station, $TSFo^{MS}$ is a value of the timer associated with the measuring station when a first beacon arrives at the measuring station, $TSFn^{WD}$ is a value of a timer synchronization function (TSF) field in the nth beacon sent by the wireless device, and $TSFo^{WD}$ is a value of the TSF field in the first beacon sent by the wireless device; and determine a location of the wireless device based at least in part on the determined plurality of TTs, and the synchronization of the timer associated with the wireless device and the timer associated with the measuring station.

10. The measuring station of claim 9, wherein the memory further stores instructions that, when executed by the processor further configure the processor to:

determine an alternate plurality of travel times ($TT_2$) of the plurality of beacons as determined according to: $TT_2=[TSFn^{MS}-(TSFo^{MS}+\alpha)]-\beta*(TSFn^{WD}-TSFo^{WD})$;

compare $TT_2$ with TT; and determine the location of the wireless device using at least in part one of $TT_2$ and TT.

11. The measuring station of claim 9, wherein determining the location of the wireless device comprises:

obtaining a plurality of estimated distances Di between the wireless device and the measuring station for a plurality of geographic locations i by varying at least one of an estimated longitude of the wireless device, an estimated latitude of the wireless device and an estimated altitude of the wireless device;

calculating a lowest sum of square residuals (SSR) value according to $SSR=\Sigma i[Di-c*TTi]^2$, where c is a speed of light and TTi is a travel time of a beacon sent by the wireless device at geographic location i;

selecting a distance D of the plurality of estimated distances Di between the wireless device and the measuring station corresponding to the lowest SSR value; and determining the location of the wireless device based at least in part on the selected distance D between the wireless device and the measuring station.

12. The measuring station of claim 9, wherein at least one of the plurality of beacons includes a timer synchronization function (TSF) field containing a corresponding TOD of the plurality of TODs.

13. The measuring station of claim 9, wherein the measuring station is located in one of a ground vehicle, a vessel in a body of water, and an airborne vehicle.

14. The measuring station of claim 9, where at least one of the plurality of TOAs is identified as a time when a frame check of a corresponding received beacon is completed.

15. The measuring station of claim 9, wherein the interface is configured to receive the plurality of beacons as the measuring station travels in an orbit around the wireless device.

16. The measuring station of claim 15, wherein the interface is configured to receive beacons of the plurality of beacons at opposite sides of the orbit.

17. A measuring station for determining a location of a wireless access point, the measuring station comprising:

an interface configured to receive a plurality of beacons from the wireless access point; and processing circuitry including a memory and a processor, the memory in communication with the processor, the memory having instructions that, when executed by the processor, configure the processor to:

identify a plurality of Time of Departures (TODs) of a corresponding plurality of beacons received at the measuring station, each of the plurality of TODs indicating when the wireless access point transmitted a beacon to the measuring station according to a timer associated with the wireless access point;

identify a plurality of Time of Arrivals (TOAs) corresponding to the plurality of beacons at the measuring station according to a timer associated with the measuring station;

synchronize the timer associated with the wireless access point with the timer associated with the measuring station, the synchronizing comprising:

applying a factor $\alpha$ for correcting the timer associated with the measuring station when the measuring station receives the plurality of beacons;

applying a factor $\beta$ for correcting a ratio of timer rates between the timer associated with the wireless access point and the timer associated with the measuring station; and applying a factor $\gamma$ for correcting changes in a timer rate ratio between the timer associated with the wireless access point and the timer associated with the measuring station;

determine a plurality of travel times (TTs) corresponding to the plurality of beacons, the plurality of TTs based at least in part upon the plurality of TODs, the plurality of TOAs, and the synchronization of the timer associated with the wireless access point and the timer associated with the measuring station, the plurality of TTs being determined according to: $TT=[TSFn^{MS}-(TSFo^{MS}+\alpha)]-\beta*(TSFn^{WD}-TSFo^{WD})-\gamma*(TSFn^{WD}-TSFo^{WD})^2$, where, $TSFn^{MS}$ is a value of the timer associated with the measuring station when an nth beacon arrives at the measuring station, $TSFo^{MS}$ is a value of the timer associated with the measuring station when a first beacon arrives at the measuring station, $TSFn^{WD}$ is a value of a timer synchronization function (TSF) field in the nth beacon sent by the wireless access point, and $TSFo^{WD}$ is a value of the TSF in the first beacon sent by the wireless access point; and determine a location of the wireless access point based at least in part on the determined plurality of TTs, and the synchronization of the timer associated with the wireless access point and the timer associated with the measuring station, the determining of the location of the wireless access point comprises:

obtaining a plurality of estimated distances Di between the wireless access point and the measuring station for a plurality of geographic locations i by varying at least one of an estimated longitude of the wireless access point, an estimated latitude of the wireless access point and an estimated altitude of the wireless access point;

calculating a lowest sum of square residuals (SSR) value according to $SSR=\Sigma i [Di-c*TTi]^2$, where c is a speed of light and TTi is a travel time of a beacon sent by the wireless access point at geographic location i;

selecting a distance D of the plurality of estimated distances Di between the wireless access point and the measuring station corresponding to the lowest SSR value; and determining the location of the wireless access point based at least in part on the selected distance D between the wireless access point and the measuring station.

* * * * *